US012754877B2

(12) United States Patent
Henry et al.

(10) Patent No.: US 12,754,877 B2
(45) Date of Patent: Oct. 6, 2026

(54) EFFICIENT PROCESSING ON A DUAL CORE PROCESSING SYSTEM

(71) Applicant: Cirrus Logic International Semiconductor Ltd., Edinburgh (GB)

(72) Inventors: Trenton Henry, Austin, TX (US); Sachin Deo, Austin, TX (US); Nariankadu Hemkumar, Austin, TX (US); Younes Djadi, Austin, TX (US); Nathan D. P. Buchanan, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 112 days.

(21) Appl. No.: 18/235,925

(22) Filed: Aug. 21, 2023

(65) Prior Publication Data

US 2025/0068585 A1 Feb. 27, 2025

(51) Int. Cl.
*G06F 15/80* (2006.01)
*G06F 9/50* (2006.01)
*G06F 9/54* (2006.01)

(52) U.S. Cl.
CPC ............ *G06F 15/80* (2013.01); *G06F 9/5061* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 7,350,036 B2 * | 3/2008 | Kim | G06F 9/52 | 711/149 |
| 8,190,864 B1 * | 5/2012 | Jordan | G06F 9/4818 | 712/244 |
| 8,458,718 B2 * | 6/2013 | Hotra | G06F 9/5061 | 718/1 |
| 10,649,914 B1 * | 5/2020 | Caccamo | G06F 9/5077 | |
| 11,846,973 B1 * | 12/2023 | Deo | G06F 13/24 | |

(Continued)

FOREIGN PATENT DOCUMENTS

| | | | |
|---|---|---|---|
| EP | 2466460 A1 * | 6/2012 | G06F 8/451 |
| EP | 4485217 A1 * | 1/2025 | G06F 13/1668 |
| WO | WO-2021188287 A1 * | 9/2021 | G06F 15/80 |
| WO | WO-2024102514 A1 * | 5/2024 | G06F 13/102 |

OTHER PUBLICATIONS

'Hardware Synchronization for Embedded Multi-Core Processors' by Christian Stoif et al., copyright 2011, IEEE. (Year: 2011).*

(Continued)

*Primary Examiner* — Steven G Snyder
(74) *Attorney, Agent, or Firm* — Jackson Walker L.L.P.

(57) ABSTRACT

A system may include a plurality of processing cores including at least a first processing core and a second processing core, a shared memory communicatively coupled to and accessible by each of the plurality of processing cores, a global monitor communicatively coupled to each of the plurality of processing cores and configured to control exclusive accesses to memory by each of the plurality of processing cores, and a software architecture embodied in non-transitory computer-readable media and configured to, when read and executed by the multicore processor, partition a plurality of processing tasks between the first processing core and the second processing core.

18 Claims, 2 Drawing Sheets

(56) References Cited

U.S. PATENT DOCUMENTS

| | | | | |
|---|---|---|---|---|
| 2003/0074508 | A1* | 4/2003 | Uhler | G06F 13/26<br>710/260 |
| 2007/0027870 | A1* | 2/2007 | Kim | G06F 9/52 |
| 2007/0094430 | A1 | 4/2007 | Speier et al. | |
| 2007/0204268 | A1* | 8/2007 | Drepper | G06F 9/461<br>718/102 |
| 2011/0107344 | A1* | 5/2011 | Kim | G06F 9/5088<br>718/105 |
| 2011/0283033 | A1* | 11/2011 | Yamada | G06F 13/24<br>710/265 |
| 2014/0281283 | A1 | 9/2014 | Sacham et al. | |
| 2017/0039093 | A1* | 2/2017 | Lin | G06F 9/5083 |
| 2017/0177338 | A1* | 6/2017 | Gschwind | G06F 9/4812 |
| 2023/0176774 | A1* | 6/2023 | Liu | G06F 3/0679<br>711/154 |
| 2024/0053998 | A1* | 2/2024 | Wen | G06F 9/4812 |
| 2024/0385978 | A1* | 11/2024 | Cao | G06F 13/20 |

OTHER PUBLICATIONS

'Synchronization Mechanisms on Modern Multi-core Architectures' by Shaoshan Liu and Jean-Luc Gaudiot, 2007. (Year: 2007).*

Machine Translation of Japanese Patent Application JP 2017111491 A, 2017. (Year: 2017).*

Machine Translation of French Patent Application FR 2931269 A1, 2009. (Year: 2009).*

Machine Translation of Chinese Patent Application CN 116010085 A, 2022. (Year: 2022).*

Machine Translation of CN 116931942 A, published 2023. (Year: 2023).*

Machine Translation of CN 118860672 A, published 2024. (Year: 2024).*

International Search Report and Written Opinion of the International Searching Authority, International Application No. PCT/US2024/042272, mailed Nov. 26, 2024.

* cited by examiner

EFFICIENT PROCESSING ON A DUAL CORE PROCESSING SYSTEM

FIELD OF DISCLOSURE

The present disclosure relates in general to circuits for electronic devices, including without limitation personal portable devices such as wireless telephones and media players, and more specifically, systems and methods for efficient processing in a multicore processing device.

BACKGROUND

Many mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position for an applications processor, whereas the camera controller may communicate to the applications processor a vector regarding an actual position of the camera, as sensed by a plurality of magnetic sensors (e.g., Hall sensors) and/or other appropriate sensors.

As mobile devices become more sophisticated, so too is camera control on such mobile devices. Accordingly, camera controllers are increasingly being implemented using multicore processors that may include, on a single integrated circuit, a plurality of processing cores and a plurality of peripheral blocks. A multicore implementation may enable improved system performance (e.g., more operations per clock cycle) and/or may enable execution of processing cores at a lower clock frequency. In addition to use in camera controllers, multicore processors find use in other computation-intensive applications.

In a multicore processor, it may be desirable to provide for logical separation of math algorithm tasks and other system tasks to allow for easy patching and scalability. It may also be desirable to enable synchronization of activities executing on the various cores, as well as maximizing parallelism of cooperating tasks running on the various cores. In addition, it may further be desirable to guard against concurrent access to a shared resource, minimize waits for cross-core dependencies, and minimize latency for potential system updates or for reporting system states.

SUMMARY

In accordance with the teachings of the present disclosure, certain disadvantages and problems associated with existing approaches to managing access to system peripherals in multicore systems may be reduced or eliminated.

In accordance with embodiments of the present disclosure, a system may include a plurality of processing cores including at least a first processing core and a second processing core, a shared memory communicatively coupled to and accessible by each of the plurality of processing cores, a global monitor communicatively coupled to each of the plurality of processing cores and configured to control exclusive accesses to memory by each of the plurality of processing cores, and a software architecture embodied in non-transitory computer-readable media and configured to, when read and executed by the multicore processor, partition a plurality of processing tasks between the first processing core and the second processing core.

In accordance with these and other embodiments of the present disclosure, a method may include, in a system having a plurality of processing cores including at least a first processing core and a second processing core and a shared memory communicatively coupled to and accessible by each of the plurality of processing cores: controlling, by a global monitor communicatively coupled to each of the plurality of processing cores, exclusive accesses to memory by each of the plurality of processing cores; and with a software architecture embodied in non-transitory computer-readable media, when the software architecture is read and executed by the multicore processor, partitioning a plurality of processing tasks between the first processing core and the second processing core.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

With the data transfer scheme according to the present disclosure, it may be possible to daisy-chain multiple device controllers and communicate to the desired target device without a large latency penalty. For a custom protocol, the data transfer scheme may simply reuse the existing command structure since all communication will act like a regular one-depth data transfer. In the meantime, the data transfer scheme may avoid the need to consume extra memory and processing power of a processor.

The systems and methods disclosed herein are not in any way limited to a particular application and may be used in various ways and in any suitable manner. For example, in some embodiments, a system controller of a communications system may be a camera system controller, a device controller may be a lens stability controller for stabilizing a camera lens or a lens focus controller for controlling focus of a camera lens, and a device target may be a sensor for detecting a camera lens position.

Figure 1:
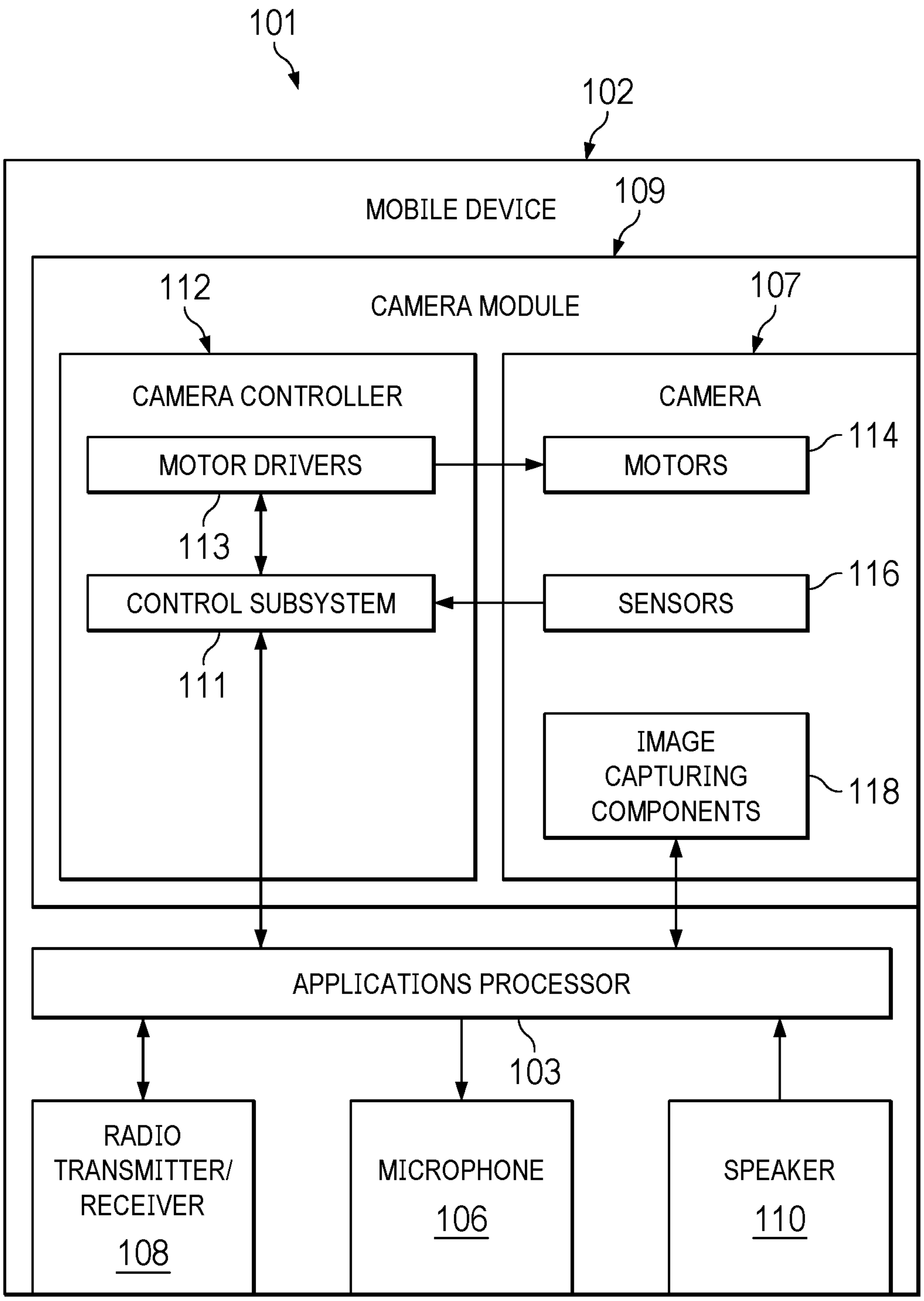
FIG. 1 illustrates a block diagram of selected components of an example mobile device, in accordance with embodiments of the present disclosure.

FIG. 1 illustrates a block diagram of selected components of an example mobile device 101, in accordance with embodiments of the present disclosure. As shown in FIG. 1, mobile device 101 may comprise an enclosure 102, an applications processor 103, a microphone 106, a radio transmitter/receiver 108, a speaker 110, and a camera module 109 comprising a camera 107 and a camera controller 112.

Enclosure 102 may comprise any suitable housing, casing, or other enclosure for housing the various components of mobile device 101. Enclosure 102 may be constructed from plastic, metal, and/or any other suitable materials. In addition, enclosure 102 may be adapted (e.g., sized and shaped) such that mobile device 101 is readily transported on a person of a user of mobile device 101. Accordingly, mobile device 101 may include but is not limited to a smart phone, a tablet computing device, a handheld computing device, a personal digital assistant, a notebook computer, a video game controller, or any other device that may be readily transported on a person of a user of mobile device 101.

Applications processor 103 may be housed within enclosure 102 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 102, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 102, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

Speaker 110 may be housed at least partially within enclosure 102 or may be external to enclosure 102, may be communicatively coupled to applications processor 103, and may comprise any system, device, or apparatus configured to produce sound in response to electrical audio signal input. In some embodiments, speaker 110 may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 102 (and partially outside of enclosure 102, to enable light to enter a lens of camera 107), and may include any suitable system, device, or apparatus for recording images (moving or still) into one or more electrical signals that may be processed by applications processor 103. As shown in FIG. 1, camera 107 may include a plurality of motors 114, sensors 116, and image capturing components 118.

Image capturing components 118 may include a collection of components configured to capture an image, including without limitation one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, cause mechanical motion of such one or more image capturing components 118 to a desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to the first linear direction and the second linear direction.

Camera controller 112 may be housed within enclosure 102, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 1, camera controller 112 may include a control subsystem 111 and motor drivers 113.

Control subsystem 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, control subsystem 111 may interpret and/or execute program instructions and/or process data stored in a memory and/or other computer-readable media accessible to control subsystem 111. Specifically, control subsystem 111 may be configured to perform functionality of camera controller 112, including but not limited to control of motors 114 and receipt and processing of data from sensors 116. In some embodiments, control subsystem 111 may comprise a multicore processor.

Motor drivers 113 may comprise a plurality of circuits, each such circuit configured to receive one or more control signals from control subsystem 111 (including without limitation a signal indicative of a desired target current for a motor 114) and drive a driving signal (e.g., a current-mode signal) to a respective motor 114 in accordance with the one or more control signals in order to control operation of such respective motor 114.

Figure 2:
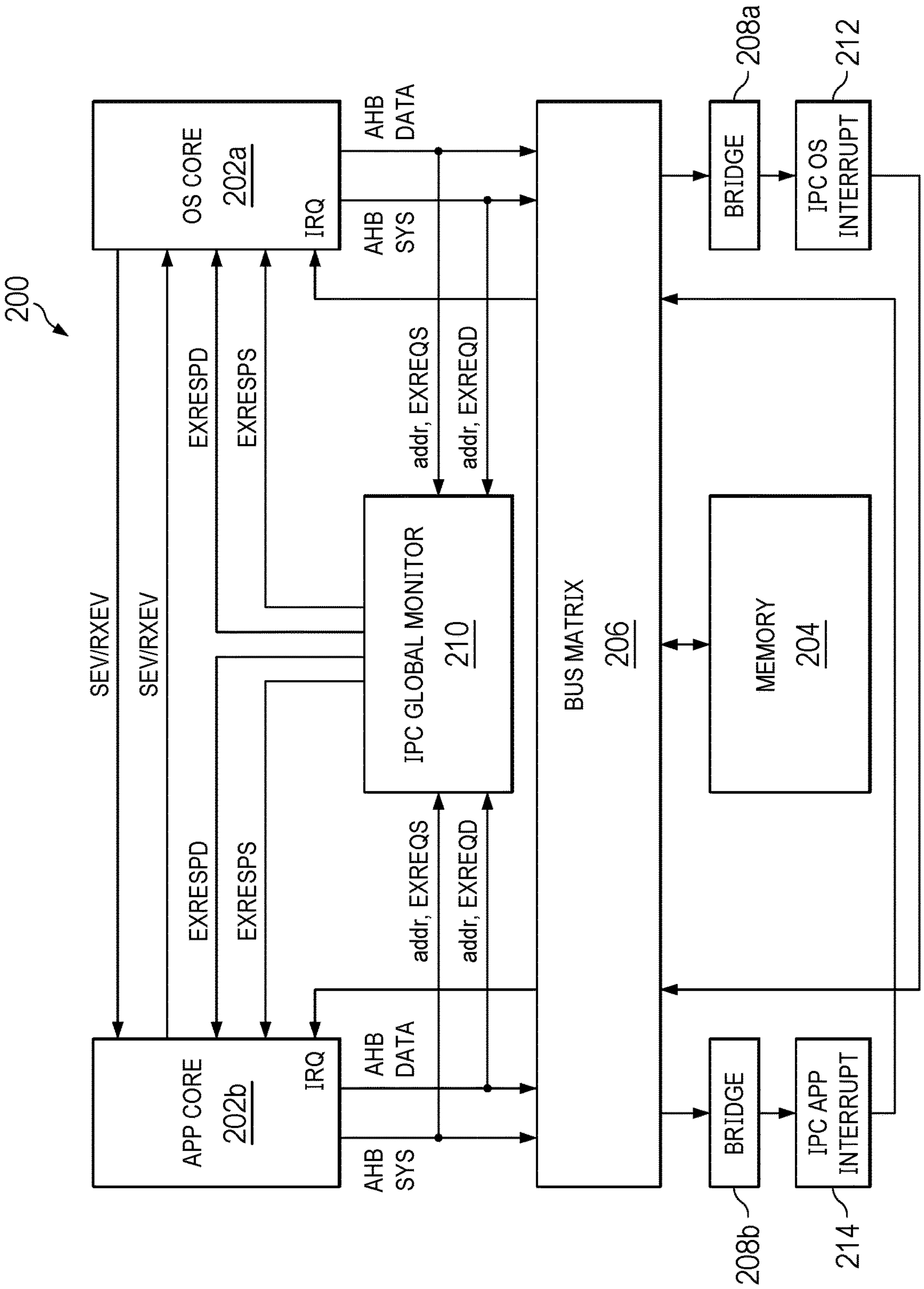
FIG. 2 illustrates a block diagram of selected components of an example multicore processor which may be used to implement a control subsystem of a camera controller, in accordance with embodiments of the present disclosure.

FIG. 2 illustrates a block diagram of selected components of an example multicore processor 200 which may be used to implement control subsystem 111 of camera controller 112, in accordance with embodiments of the present disclosure. As shown in FIG. 2, multicore processor 200 may include a plurality of cores 202 including an operating system (OS) core 202*a* and an application APP core 202*b*, a memory 204, a bus matrix 206, bridges 208 (e.g., bridges 208*a* and 208*b*), an inter-process communication (IPC) global monitor 210, an IPC OS interrupt register 212 and an IPC APP interrupt register 214.

Each core 202 may comprise a separate processing unit, which may read and execute program instructions, such that multicore processor 200 may execute instructions on multiple cores 202 at the same time, which may increase overall execution speed for programs of instructions that support multithreading or other parallel computing techniques. In some embodiments, a core 202 may interpret and/or execute program instructions and/or process data stored in memory 204 and/or another component of multicore processor 200. Although FIG. 2 depicts only two cores 202 for the purposes of clarity and exposition, it is understood that multicore processor 200 may include any suitable number of cores 202 and/or controllers.

In operation, a software architecture executing on multicore processor 200 may partition particular tasks between cores 202. For example, the following table sets forth an example of portioning of tasks between OS core 202*a* and APP core 202*b*:

| OS core 202a | APP Core 202b |
|---|---|
| 1. Device configuration and enabling<br>2. Management of APP core 202b (start-up/shutdown)<br>3. Open-loop code application<br>4. Processing mode management<br>5. Device state management<br>6. Open-loop or closed-loop management of motors 114<br>7. Receive closed-loop command updates from applications processor 103 and send the processed commands to APP core 202b<br>8. Low-pass filtering<br>9. Read data preparation<br>10. Analog configuration, reconfiguration, and analog assist for motors 114 | 1. Control math<br>2. Closed-loop digital-to-analog code update for motors 114<br>3. Update internal states when OS core 202a sends closed-loop command updates |

A memory 204 may be communicatively coupled to cores 202 via bus matrix 206 and may include any system, device, or apparatus configured to retain program instructions and/or data for a period of time (e.g., computer-readable media). A memory 204 may include RAM, EEPROM, a PCMCIA card, flash memory, magnetic storage, opto-magnetic storage, or any suitable selection and/or array of volatile or non-volatile memory.

Bus matrix 206 may include any suitable communications bus for communicatively coupling cores 202, memory 204, and bridges 208 to one another. In some embodiments, bus matrix 206 may comprise an Advanced High-performance Bus (AHB) in accordance with the Advanced Microcontroller Bus Architecture (AMBA) specification.

A bridge 208 may comprise a peripheral bus interface configured to communicatively couple an interrupt register (e.g., IPC OS interrupt register 212, IPC APP interrupt register 214) to a respective core 202 via bus matrix 206. In some embodiments, a bridge 208 may comprise an Advanced Peripheral Bus (APB) bridge in accordance with the AMBA specification.

IPC global monitor 210 may comprise any system, device, or apparatus that enables the exclusive accesses that may be required for acquiring and releasing a lock used for managing a shared resource (e.g., an address in memory 204) among multiple cores 202. For example, IPC global monitor 210 may tag an address accessed by an exclusive load instruction (e.g., an LDREX instruction) for each core 202, which may include two operations: the changing of a lock state for the address and the detection and rejection of a change if the core performing the change is not aware of the current state. The exclusive read operation of a core 202 may check the lock state and may also notify hardware to monitor for other writes, for example to determine if another core 202 attempts to write the value to the address, thus violating the view of the lock on the address by a core 202.

Thus, a particular core 202 may use an exclusive load instruction to check if a particular memory address is available. If available, the particular core 202 may perform an exclusive store instruction to claim the memory address. Detection of other cores 202 changing the lock states may cause the exclusive store instruction to fail. If the memory address lock has not changed, the exclusive store instruction may succeed, as the particular core 202 may gain exclusive access to the memory address tagged in the exclusive load instruction. On the other hand, it may be critical that the exclusive store instruction fail if another core 202 modified the lock state because the particular core performed the exclusive load instruction. Accordingly, the core 202 may claim and own the memory address (or other shared resource). The table set forth below demonstrates example arbitration that may be performed when both cores 202 attempt to simultaneously store to the same memory address:

| Instruction | APP Store | APP Exclusive Store (To APP Exclusive Address) | APP Exclusive Store (NOT To APP Exclusive Address) |
|---|---|---|---|
| OS Store | APP: Succeed<br>OS: Succeed | APP: Fail<br>OS: Succeed | APP: Fail<br>OS: Succeed |
| OS Exclusive Store (To OS Exclusive Address) | APP: Succeed<br>OS: Fail | APP: Fail<br>OS: Succeed | APP: Fail<br>OS: Succeed |
| OS Exclusive Store (NOT To OS Exclusive Address) | APP: Succeed<br>OS: Fail | APP: Succeed<br>OS: Fail | APP: Fail<br>OS: Fail |

Thus, IPC global monitor 210 may be used in the management of shared resources, for example by enabling multiple cores 202 to safely implement a mutex to lock shared resources for exclusive access and unlock such resources after usage, in order to achieve atomicity and consistency of command updates and preparation of read data.

Accordingly, memory 204 may include a shared memory wrapper to interface between one or more shared memory banks in memory 204 and bus matrix 206. Such shared memory wrapper may include write protection logic that selectively protects against write operations to memory addressed by cores 202 in accordance with which particular core owns each address.

IPC OS interrupt register 212 may include a memory register for sending an interrupt request to APP core 202*b*. Similarly, IPC APP interrupt register 214 may include a memory register for sending an interrupt request to OS core 202*a*. Each interrupt register may include multiple fields or bits, each field or bit associated with a distinct interrupt, each distinct interrupt having a unique priority level. For example, in particular embodiments, IPC OS interrupt register 212 may include two bits, bit 1 and bit 0, and OS core 202*a* may send an interrupt request to APP core 202*b* by writing a value (e.g., logic 1) to either bit, with one bit (e.g., bit 1) being associated with a higher-priority interrupt request than the other bit (e.g., bit 0). Likewise, in such particular embodiments, IPC APP interrupt register 214 may include two bits, bit 1 and bit 0, and APP core 202*b* may send an interrupt request to OS core 202*a* by writing a value (e.g., logic 1) to either bit, with one bit (e.g., bit 1) being associated with a higher-priority interrupt request than the other bit (e.g., bit 0). Each interrupt register may be coupled to an interrupt controller of the other core 202. IPC OS interrupt register 212 and IPC APP interrupt register 214 may provide a low-overhead scheme for communicating interrupt requests which are prioritized to service appropriate contexts.

Such priority interrupt scheme may allow for utilization of prioritized queues for inter-core messaging in which messages in higher-priority queues are processed urgently, and messages in lower-priority queues are processed in due time, but never lost. For example, if APP core 202*b* were to place a message in a high-priority execution queue, APP core 202*b* may issue a high-priority interrupt request to OS core 202*a* which may then process the message. In contrast, as another example, if OS core 202*a* places a message in a low-priority queue, the corresponding low-priority interrupt request may be processed by APP core 202*b* with low priority. Thus, messages residing in the queues remain and may be retained and may be processed based on their priorities in a non-time critical processing segment while leaving a time-critical processing segment uninterrupted with predictable latencies.

As also shown in FIG. 2, OS core 202*a* and APP core 202*b* may communicate dedicated event signals to one another (e.g., via connections labeled "SEV/RXEV" in FIG. 2), which may be used in conjunction with the monitoring of cross-core sleep and wake activity to achieve load balancing. A sending core 202 may wake up a sleeping core 202 by use of dedicated event signals and handing off tasks to the sleeping core 202, thus allowing a core 202 to sleep while waiting for a shared resource (e.g., shared memory) to become available. A core 202 may communicate an event to other cores 202, regardless of their sleep state, when a shared resource becomes available and any sleeping core 202 may be woken up in response to the event. Further, in some embodiments, an IPC interrupt may also be used to wake a sleeping core 202.

Thus, in a typical operating scenario, neither core 202 may be required to wait on the other, with the maximum wait in a worst-case scenario being within the time period required for a memory copy operation. The interrupt request and queueing mechanism described above may allow for quickly raising cross-core interrupts and flexibility in processing the messages in accordance with their prioritization scheme.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a plurality of processing cores including at least a first processing core and a second processing core;

a shared memory communicatively coupled to and accessible by each of the plurality of processing cores;

a global monitor communicatively coupled to each of the plurality of processing cores and configured to control exclusive accesses to memory by each of the plurality of processing cores; and a software architecture embodied in non-transitory computer-readable media and configured to, when read and executed by a multicore processor, statically partition a plurality of processing tasks between the first processing core and the second processing core.

2. The system of claim 1, wherein processing tasks allocated to the first processing core comprise one or more of mode management of a device comprising the plurality of processing cores, updating of a system state of the system, updating of digital-to-analog controller codes in an open-loop system controlled by the multicore processor responsive to commands received by the multicore processor, receipt and communication of commands associated with a closed-loop system controlled by the multicore processor; and reporting of system state data to an application processor external to the multicore processor.

3. The system of claim 1, wherein processing tasks allocated to the second processing core comprise one or more of performance of control math for a system controlled by the multicore processor, generation of digital-to-analog controller codes for a closed-loop system controlled by the multicore processor, and updating of internal states responsive to commands received from the first processing core.

4. The system of claim 1, further comprising:

a first interrupt register communicatively coupled between the first processing core and the second processing core; and a second interrupt register communicatively coupled between the first processing core and the second processing core;

wherein:

the first processing core is configured to communicate a first interrupt request to the second processing core by writing information to the first interrupt register; and the second processing core is configured to communicate a second interrupt request to the first processing core by writing information to the second interrupt register.

5. The system of claim 4, wherein:

the information written to the first interrupt register includes a priority associated with the first interrupt request; and the information written to the second interrupt register includes a priority associated with the second interrupt request.

6. The system of claim 5, wherein messages between the first processing core and the second processing core are prioritized in queues in accordance with the priority associated with the first interrupt request and the priority associated with the second interrupt request.

7. The system of claim 6, wherein messages residing in the queues are retained and are processed based on their priorities in a non-time critical processing segment while leaving a time-critical processing segment uninterrupted with predictable latencies.

8. The system of claim 1, further comprising an interrupt register that indicates sleep statuses of the first processing core and the second processing core, wherein the interrupt register is readable by the first processing core and the second processing core to be used in connection with event signals or interrupts to achieve dynamic load balancing between the first processing core and the second processing core.

9. The system of claim 1, wherein statically partitioning the plurality of processing tasks between the first processing core and the second processing core comprises:

partitioning regular time-ordered tasks to the first processing core; and partitioning irregular event and response-driven tasks to the second processing core.

10. A method comprising, in a system having a plurality of processing cores including at least a first processing core and a second processing core and a shared memory communicatively coupled to and accessible by each of the plurality of processing cores:

controlling, by a global monitor communicatively coupled to each of the plurality of processing cores, exclusive accesses to memory by each of the plurality of processing cores; and with a software architecture embodied in non-transitory computer-readable media, when the software architecture is read and executed by a multicore processor, statically partitioning a plurality of processing tasks between the first processing core and the second processing core.

11. The method of claim 10, wherein processing tasks allocated to the first processing core comprise one or more of mode management of a device comprising the plurality of processing cores, updating of a system state of the system, updating of digital-to-analog controller codes in an open-loop system controlled by the multicore processor responsive to commands received by the multicore processor, receipt and communication of commands associated with a closed-loop system controlled by the multicore processor; and reporting of system state data to an application processor external to the multicore processor.

12. The method of claim 10, wherein processing tasks allocated to the second processing core comprise one or more of performance of control math for a system controlled by the multicore processor, generation of digital-to-analog controller codes for a closed-loop system controlled by the multicore processor, and updating of internal states responsive to commands received from the first processing core.

13. The method of claim 10, further comprising:

communicating, with the first processing core, a first interrupt request to the second processing core by writing information to a first interrupt register communicatively coupled between the first processing core and the second processing core; and communicating, with the second processing core, a second interrupt request to the first processing core by writing information to a second interrupt register communicatively coupled between the first processing core and the second processing core.

14. The method of claim 13, wherein:

the information written to the first interrupt register includes a priority associated with the first interrupt request; and the information written to the second interrupt register includes a priority associated with the second interrupt request.

15. The method of claim 14, further comprising prioritizing messages between the first processing core and the second processing core in queues in accordance with the priority associated with the first interrupt request and the priority associated with the second interrupt request.

16. The method of claim 15, further comprising retaining and processing messages residing in the queues based on their priorities in a non-time critical processing segment while leaving a time-critical processing segment uninterrupted with predictable latencies.

17. The method of claim 10, further comprising indicating, with an interrupt register, sleep statuses of the first processing core and the second processing core, wherein the interrupt register is readable by the first processing core and the second processing core to be used in connection with event signals or interrupts to achieve dynamic load balancing between the first processing core and the second processing core.

18. The method of claim 10, wherein statically partitioning the plurality of processing tasks between the first processing core and the second processing core comprises:

partitioning regular time-ordered tasks to the first processing core; and partitioning irregular event and response-driven tasks to the second processing core.

* * * * *